(12) United States Patent
Wimberger

(10) Patent No.: US 7,488,167 B2
(45) Date of Patent: Feb. 10, 2009

(54) CLOSING UNIT FOR AN INJECTION MOLDING MACHINE WITH STACK MOLD

(75) Inventor: Klaus Wimberger, Gräfelfing (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 4 days.

(21) Appl. No.: 11/696,426

(22) Filed: Apr. 4, 2007

(65) Prior Publication Data

US 2007/0190205 A1     Aug. 16, 2007

Related U.S. Application Data

(63) Continuation of application No. PCT/EP2005/054907, filed on Sep. 29, 2005.

(30) Foreign Application Priority Data

Oct. 15, 2004   (DE) ................ 10 2004 050 311

(51) Int. Cl.
*B29C 45/17*    (2006.01)
(52) U.S. Cl. .............. 425/182; 425/183; 425/190; 425/556; 425/576
(58) Field of Classification Search ............. 425/112, 425/182, 183, 190, 192 R, 556, 575, 576, 425/588
See application file for complete search history.

(56) References Cited

U.S. PATENT DOCUMENTS 4,005,966 A * 2/1977 Nutting ................. 425/441
5,069,615 A * 12/1991 Schad et al. ............. 425/556
6,139,305 A   10/2000 Nesch

FOREIGN PATENT DOCUMENTS

| DE | 37 16 796 | 11/1987 |
|---|---|---|
| DE | 101 52 394 | 5/2003 |
| EP | 0 475 243 | 3/1992 |
| EP | 0 895 848 | 1/2003 |
| EP | 1 119 449 | 2/2003 |
| WO | WO 97/48540 | 12/1997 |

* cited by examiner

*Primary Examiner*—James Mackey
(74) *Attorney, Agent, or Firm*—Henry M. Feiereisen; Ursula B. Day

(57) ABSTRACT

A closing unit for an injection molding machine includes first and second platens, of which at least one is movable, and an intermediate plate disposed between the first and second platens. A molding tool is disposed between one of the first and second platens and the intermediate plate. In order to allow operation of the closing unit with intermediate plate also as a single-face mold for molding a single-component product, the molding operation between the other one of the first and second platens and the intermediate plate is disabled by a dummy tool or by securely fixing the intermediate plate to the other one of the first and second platens. Removal of an end product from the molding tool is realized by at least one ejector which is arranged in or on the intermediate plate.

13 Claims, 4 Drawing Sheets

CLOSING UNIT FOR AN INJECTION MOLDING MACHINE WITH STACK MOLD

CROSS-REFERENCES TO RELATED APPLICATIONS

This application is a continuation of prior filed copending PCT International application no. PCT/EP2005/054907, filed Sep. 29, 2005, which designated the United States and has been published but not in English as International Publication No. WO 2006/042781 and on which priority is claimed under 35 U.S.C. §120, and which claims the priority of German Patent Application, Ser. No. 10 2004 050 311.7, filed Oct. 15, 2004, pursuant to 35 U.S.C. 119(a)-(d), the contents of which are incorporated herein by reference in its entirety as if fully set forth herein.

BACKGROUND OF THE INVENTION

The present invention relates to a closing unit for an injection molding machine with a stack mold.

Nothing in the following discussion of the state of the art is to be construed as an admission of prior art.

A closing unit of a type involved here includes two platens and an intermediate plate, also called stack platen, which is disposed between the two platens, with a molding tool being provided between one platen and the intermediate plate and another molding tool disposed between the other platen and the intermediate plate, so as operate for stack application. In this way, several molding tools with at least two mold cavities can be provided and maintained in a closed state by applying a same clamping force. When the intermediate plate is constructed as a swivel (or rotary) platen, a product can be produced in a first cavity, and after rotation of the swivel platen, a further normally different material can be applied onto the product in a second cavity to produce a finished multi-component product, such as, e.g. two-component or three-component products. The intermediate plate is able to rotate and may also be constructed for linear movement in opening and closing directions. Examples of stack molds with swivel platen construction are disclosed in German Offenlegungsschrift DE 101 52 394, European Pat. Publ. No. EP 0 895 848, and European Pat. No. EP 1 119 449.

These conventional injection molding machines with a closing unit of a type described above are suitable for an operator only in those situations when both mold cavities are utilized for making the product. A closing unit with an intermediate plate is, however, unsuitable for use as a single-face mold for making a single-component product.

It would therefore be desirable and advantageous to provide an improved closing unit to obviate prior art shortcomings and to enhance versatility by allowing its application as a single-face mold as well as for producing multi-component products.

SUMMARY OF THE INVENTION

According to one aspect of the present invention, a closing unit for an injection molding machine includes first and second platens, of which at least one is movable, an intermediate plate disposed between the first and second platens, a molding tool disposed between one of the first and second platens and the intermediate plate, means adapted for disabling a molding operation between the other one of the first and second platens and the intermediate plate, and at least one ejector arranged in or on the intermediate plate.

According to another feature of the present invention, the closing unit may include a dummy tool which is disposed between the other one of the first and second platens and the intermediate plate and in which no product is made, so as to disable the molding operation between the other one of the first and second platens. As an alternative, the molding operation may also be disabled on this side of the intermediate plate by firmly securing the intermediate plate to the other one of the first and second platens.

The present invention resolves prior art problems by either arranging a dummy tool between one of the platens and the intermediate plate, or by securely fixing the intermediate plate to the platen. Thus, the molding tool on the other side of the intermediate plate can be used in cooperation with the intermediate plate for making a single-component product. As a result, an operator is able to optimize the equipment.

The closing unit may be constructed in various ways. The intermediate plate may be rotatably constructed but fixed in place, with the two platens movable linearly in a direction to and away from one another. As an alternative, one of the two platens may be fixed, with the other platen and the intermediate plate being linearly movable. The intermediate plate may be constructed as a swivel platen for rotation about a rotation axis so that the sides of the swivel plates can be turned by 180°, optionally also by 90°.

The replacement of a molding tool by the dummy tool allows the production of a single-component product. The dummy tool may be installed in various ways. One option may involve a single-piece construction of the dummy tool which can be mounted to one of the platens or to the intermediate plate. Another option may involve a two-part or multi-part construction of the dummy tool. In a two-part construction, one part may be mounted to one of the platens, and the other part may be mounted to the associated side of the intermediate plate of the closing unit. If in this case, the intermediate plate is constructed as a swivel platen, the drive for the swivel platen is idle so that the swivel plate is unable to rotate during this type of operation of the injection molding machine.

According to another feature of the present invention, the intermediate plate and one of the platens, optionally through intervention of the dummy tool, may be securely fixed to one another. In this case, the dummy tool may be connected to the platen as well as to the intermediate plate. It may even be possible to omit the dummy tool altogether and to securely fix the intermediate plate directly to the platen, thereby realizing a compact unit. When being connected to the platen, with or without interposed dummy tool, the intermediate plate has to follow the movement of the platen. In other words, if the platen is the fixed platen, the intermediate plate is also stationary during production of the single-component product. On the other hand, if the platen to which the intermediate plate is securely fixed represents the movable platen, then the intermediate plate is constructed for travel as well. It is, of course, necessary to disengage or render ineffective a possibly existing drive for the intermediate plate so that the intermediate plate can be moved by the platen.

An ejector for expelling an end product may be provided in an area of a platen. However, when the closing unit is used also for operation as a single-face mold, it is currently preferred to combine the intermediate plate with at least one ejector by integrating the ejector in the area of the intermediate plate. In other words, one or more ejectors may be arranged in or on the intermediate plate. When several ejectors are provided, each platen may be associated to a respective ejector integrated in the area of the intermediate plate. Each ejector may hereby have its own drive, or a single drive may be provided for jointly operating two ejectors. In the latter case, a linkage may be provided for interconnecting the single drive with the ejectors, with the linkage being constructed to render a connection between the drive and one of the ejectors no longer effective so as to be prevented from interfering with an interposition of a dummy tool.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
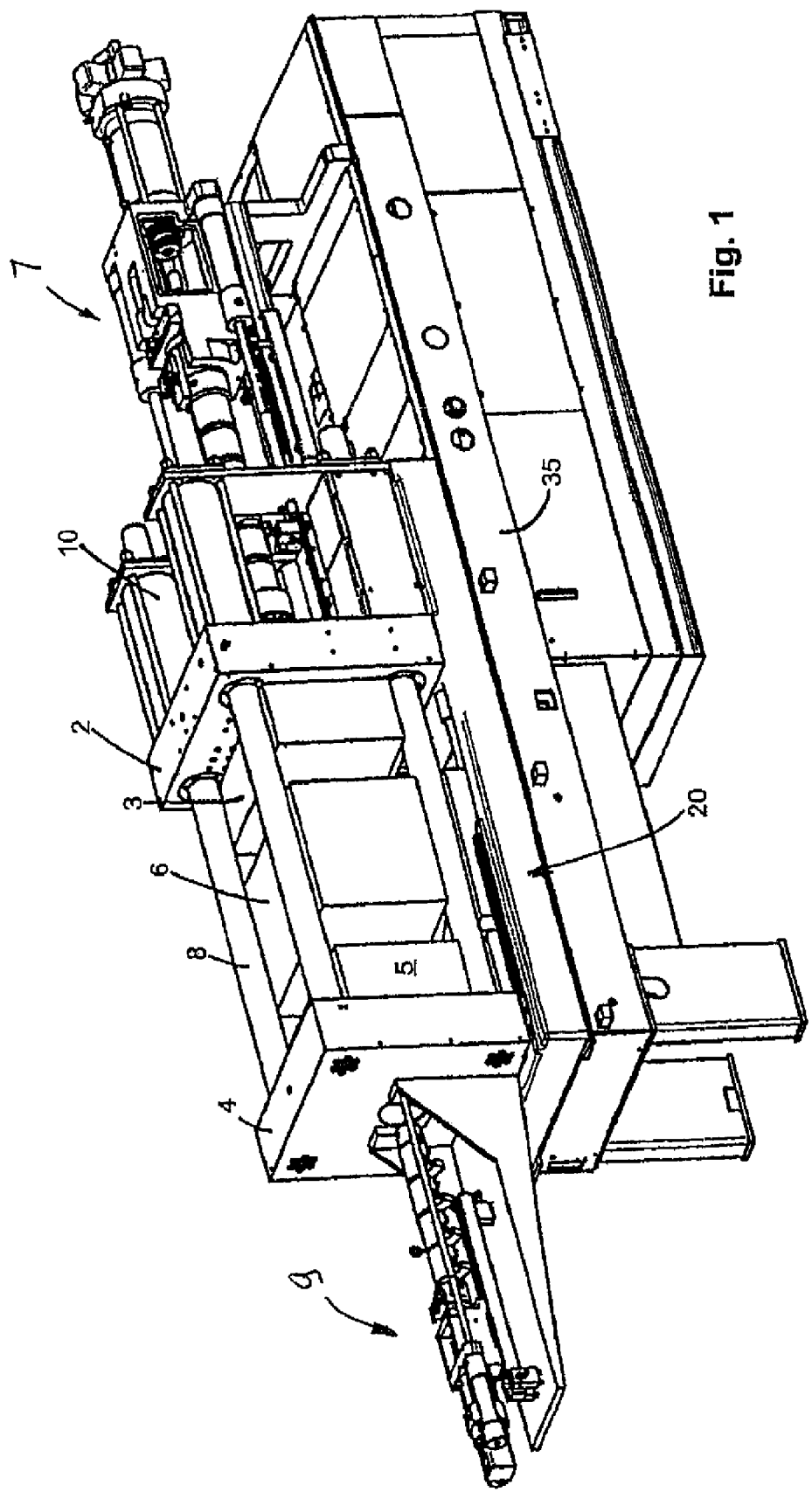
FIG. 1 is a schematic top and side perspective view of an injection molding machine, equipped with a closing unit according to the present invention with a swivel platen.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic top and side perspective view of an injection molding machine, equipped with a closing unit according to the present invention. The closing unit includes a fixed platen 2 and a movable platen 4 which are both supported via a frame 20 upon a machine bed 35. Supported on the machine bed 35 is an injection unit, generally designated by reference numeral 7 and provided to produce plastic melt for injection into a mold cavity. A further plasticizing unit, generally designated by reference numeral 9 is attached via a mounting to the movable platen 4. Disposed between the platens 2, 4 is an intermediate plate 6 which is constructed as a swivel platen and is able to rotate as well as move in a linear direction.

Both platens 2, 4 are interconnected by four tie rods 8 which are securely connected to the movable platen 4 and extend through the fixed platen 2 for acceptance in pertaining hydraulic drives 10. The movable platen 4 can travel in a direction to and away from the fixed platen 2 through operation of the hydraulic drives 10. In addition, the hydraulic drives 10 apply also the clamping force.

A molding tool 3 is attached to the fixed platen 2, whereas a dummy tool 5 is mounted to the movable platen 4 so that the closing unit can also be used as single-face mold for producing a single-component product. The molding tool 3 defines with a respective contour on the molding-tool-proximal side of the swivel platen 6 a mold cavity into which plastic melt can be injected by the injection unit 7, once the closing unit is clamped. The dummy tool 5 is operated on the opposite molding-tool-distal side of the swivel platen 6 just like a normal molding tool, except for the absence of a mold cavity so that nothing is produced on this side of the swivel platen 6. The plasticizing unit 9 is idle as well. As a result, when the injection molding machine is operated and the closing unit is clamped, only one cavity is formed between the platen 3 and the one side of the swivel platen 6 for receiving the plastic melt injected by the injection unit 7 and for molding the product. No product is made on the other side of the swivel plate 6. In other words, the dummy tool 5 is used only for application of the closing unit with a single molding tool.

In accordance with the invention, a closing unit of this configuration can also be used with standard molding tools in the presence of an intermediate plate.

Figure 2:
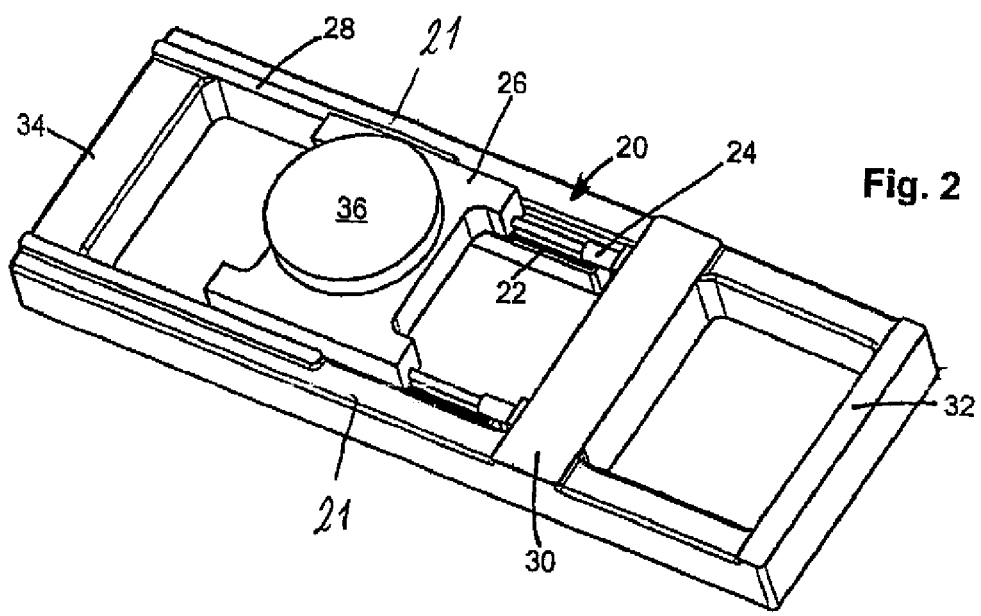
FIG. 2 is a top perspective view of a support frame for the swivel platen of the closing unit of FIG. 1.

FIG. 2 shows the frame 20 for support of the swivel platen 6 and installation in the closing unit. The frame 20 has parallel legs 21 which are interconnected and stiffened by struts 30, 32, 34. Disposed on both sides of the frame 20 is a linear bearing or slide bearing 22 for sliding support of a base plate 26 which thus assumes the function of a sliding table. The linear displacement of the base plate 26 is implemented by hydraulic cylinders 24. Placed on the base plate 26 is a turntable 36 for support of the swivel platen 6, not shown in FIG. 2.

Figure 3:
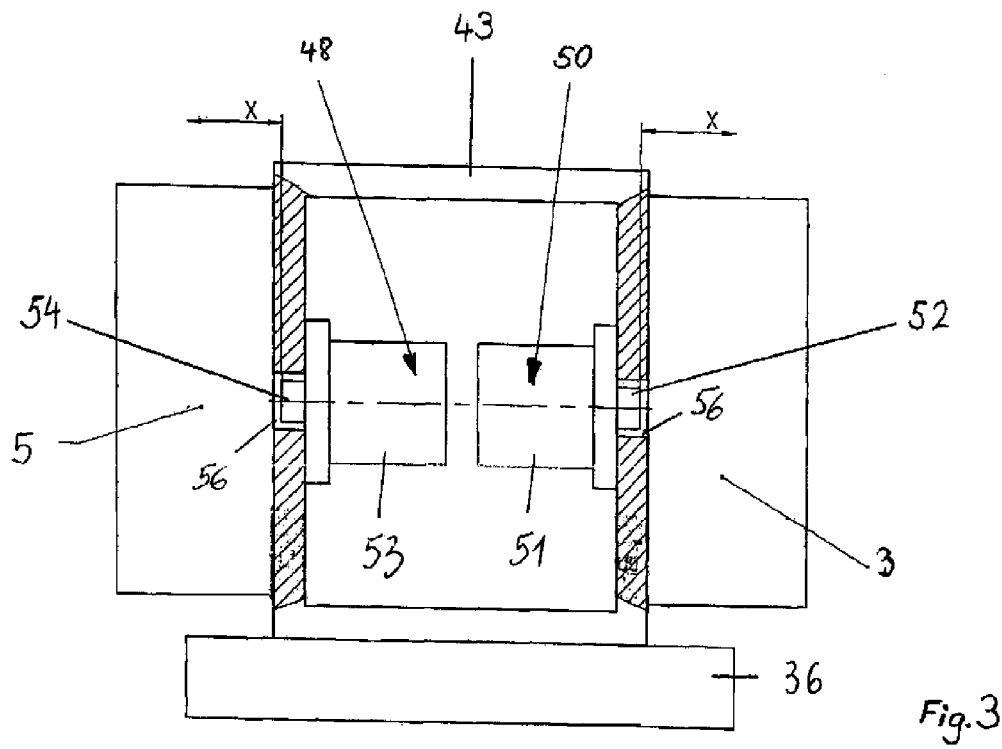
FIG. 3 is a greatly simplified fragmentary illustration of one embodiment of a closing unit according to the present invention, showing a intermediate plate with two integrated ejectors.

Referring now to FIG. 3, there is shown a greatly simplified fragmentary illustration of one embodiment of a closing unit according to the present invention, having an intermediate plate 43 constructed as swivel platen mounted onto the turntable 36. Of course, it is certainly possible to construct the frame 20 without turntable so that the intermediate plate 43 is then directly mounted onto the base plate 26 of the frame 20. Parts corresponding with those in FIG. 1 are denoted by identical reference numerals and not explained again. The description below will center on the differences between the embodiments. In this embodiment, the swivel platen 43 has a hollow interior. Provided in the swivel platen 43 are two ejectors 48, 50, with ejector 48 including an ejector pin 54 and a separate drive 53 which is mounted to the swivel plate 43 on its inside wall adjacent to the dummy tool 5, and with ejector 50 including an ejector pin 52 and a separate drive 51 which is mounted to the swivel plate 43 on its inside wall adjacent to the molding tool 3. Both ejector pins 52, 54 are able to move in openings 56 of the swivel platen 43 to execute a stroke, as indicated with double arrow X, by the drives 51, 53, respectively. In the non-limiting example of FIG. 3, only the ejector 50, associated to the molding tool 3, is operational, while the ejector 48, associated to the dummy tool 5, remains idle.

Figure 4:
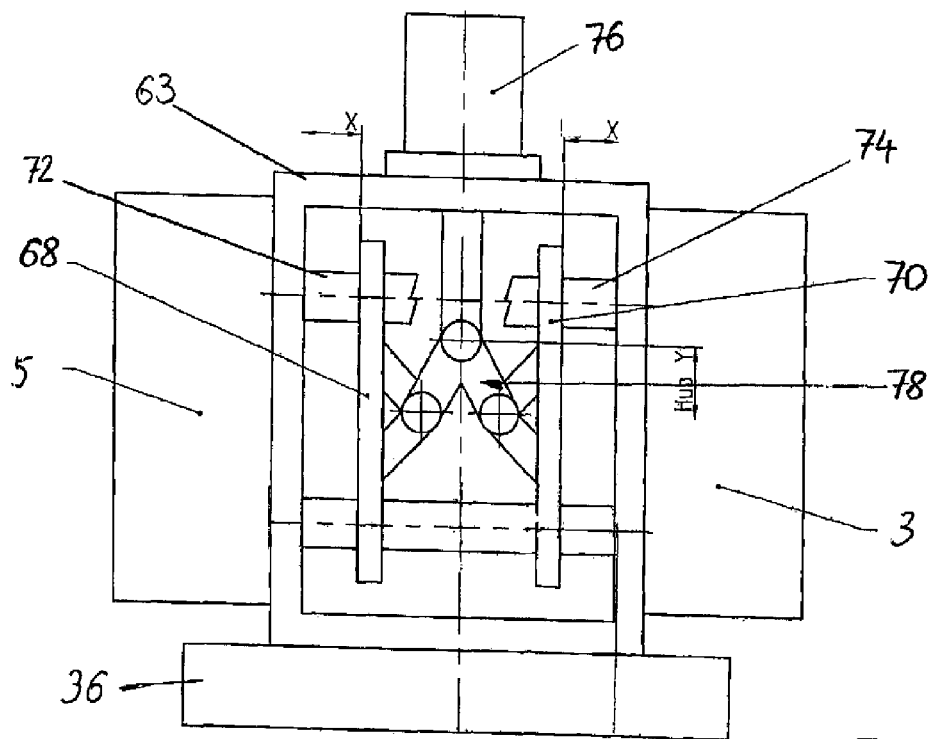
FIG. 4 is a greatly simplified fragmentary illustration of another embodiment of a closing unit according to the present invention, showing a intermediate plate with an ejector drive.

FIG. 4 shows a greatly simplified fragmentary illustration of another embodiment of a closing unit according to the present invention, having an intermediate plate 63 constructed as swivel platen mounted onto the turntable 36. Of course, it is again possible to construct the frame 20 without turntable so that the intermediate plate 63 is then directly mounted onto the base plate 26 of the frame 20. Parts corresponding with those in FIG. 3 are denoted by identical reference numerals and not explained again. The description below will center on the differences between the embodiments. In this embodiment, the swivel platen 63 has also a hollow interior in which two ejector plates 68, 70 are guided on respective guide pillars 72, 74 for actuating respective ejector pins or bolts (not shown). The ejector plates 68, 70 are operated by a common drive 76 to execute a stroke, as indicated by double arrow X. A linkage in the form of a toggle mechanism 78 is disposed between the drive 76 and the ejector plates 68, 70. In the event, the arrangement of the dummy tool 5 requires the ejectors 48, 50 to be out of action, the linkage between the drive 76 and the ejector plate 68 is cut. Persons skilled in the art will understand that the provision of such a linkage is optional and not necessarily required because the unillustrated ejector pin may also move into respective recesses of the dummy tool 5.

The embodiments of the closing unit according to FIGS. 3 and 4 can be used in many configurations. For example, the dummy tool 5 may have a two-part configuration, with one part mounted to the intermediate plate 43; 63, as shown in FIGS. 3 and 4, respectively, and the other part mounted to the platen 4. As an alternative, the dummy tool 5 may be of single-piece construction. As described above, it is also conceivable to simply place the intermediate plate 43; 63 on a slide table which does not rotate like the turntable 36. In any event, the combination of intermediate plate and platens results in the formation of only a single mold cavity on one side of the intermediate plate, when the closing unit is clamped, while the dummy tool on the other side of the intermediate plate merely ensures that the existing stroke length is bridged so that the closing unit can be used for operating a single-face mold and application of a required clamping force.

Figure 5:
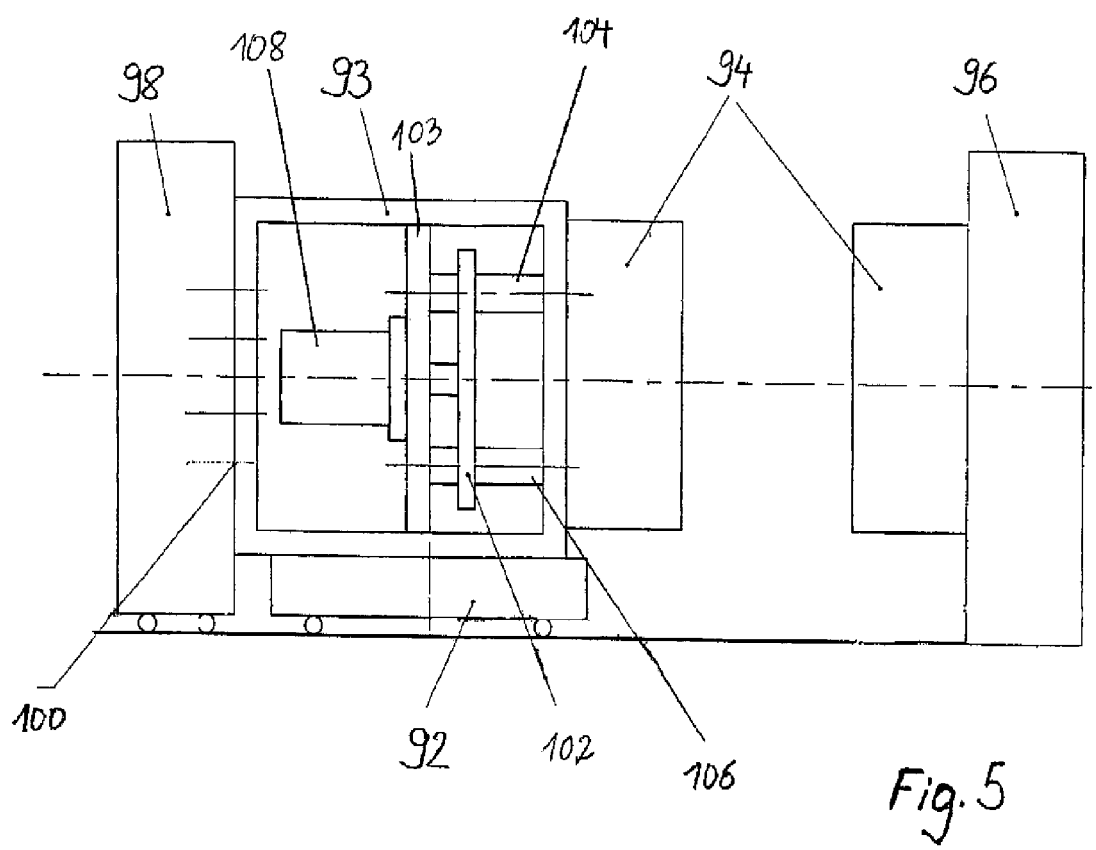
FIG. 5 is a greatly simplified fragmentary illustration of yet another embodiment of a closing unit according to the present invention, showing a fixed securement of an intermediate plate with a platen.

Turning now to FIG. 5, there is shown a greatly simplified fragmentary illustration of yet another embodiment of a closing unit according to the present invention. This type of closing unit allows a change in stroke length. The closing unit includes a fixed platen 96 which is arranged on an unillustrated machine bed. Opposing the platen 96 is a movable platen 98 which is arranged on the machine bed for back-and-forth movement in relation to the platen 98. Disposed between the platens 96, 98 is a slide table 92 for support of an intermediate plate 93. The confronting sides of the fixed platen 96 and the intermediate plate 93 carry respective mold halves of a molding tool 94.

When the closing unit is to be converted to a single-face mold and thus used for producing a single-component product, the intermediate plate 93 is securely fixed to the platen 98 by a bolted connection 100. The intermediate plate 93 has a hollow interior for accommodating an ejector assembly with two ejector pins 104, 106 and an ejector plate 102. A drive 108 is fitted inside the interior of the intermediate plate 93 for driving the ejector plate 102. The drive 108 is supported on a separate inside wall 103.

At operation, as the closing unit moves the movable platen 98 in a direction of the fixed platen 96, also the intermediate plate 93 is moved at the same time as a result of its bolted connection 100 to the movable platen 98. This movement enables an opening and closing of the molding tool 94 so that the injection molding machine can be operated accordingly. As the intermediate plate 93 is arranged between a portion of the molding tool 94 and the movable platen 98, this construction of the closing unit does not require a removal of the intermediate plate 93. Rather, when retrofitting the closing unit for making a multi-component product, it is only required to loosen the bolted connection 100 and move the slide table 92 away from the platen 98 for installation of a respective molding tool. Conversely, when returning the closing unit for making a single-component product, the slide table 92 is move by its own drive toward the platen 98 for subsequent bolting of the intermediate plate 93 to the platen 98. Of course, when the closing unit is operated for making a single-component product, the drive for the slide table 92 needs to be disengaged in order to allow the joint movement of the platen 98 with the intermediate plate 93.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A closing unit for an injection molding machine, comprising:
   first and second platens, at least one of which being movable;
   an intermediate plate disposed between the first and second platens;
   a molding tool disposed between one of the first and second platens and the intermediate plate;
   means adapted for disabling a molding operation between the other one of the first and second platens and the intermediate plate, wherein the means include a dummy tool which is disposed between the other one of the first and second platens and the intermediate plate and in which no product is made; and
   at least one ejector arranged in or on the intermediate plate.

2. The closing unit of claim 1, wherein the intermediate plate is firmly secured to the other one of the first and second platens for disabling the molding operation.

3. The closing unit of claim 1, wherein the intermediate plate is stationary, said first and second platens constructed for relative movement toward one another.

4. The closing unit of claim 1, wherein the intermediate plate is constructed for linear movement.

5. The closing unit of claim 1, wherein the intermediate plate is constructed as a rotatable swivel platen.

6. The closing unit of claim 1, wherein the dummy tool is made of two parts, one part mounted to the other one of the first and second platens, and another part mounted to the intermediate plate, with both parts bearing upon one another in a clamped state of the closing unit.

7. The closing unit of claim 1, wherein the dummy tool is of single-piece construction and mounted to one member selected from the group consisting of the other one of the first and second platens and the intermediate plate, said dummy tool bearing upon the other member of the group consisting of the other one of the first and second platens and the intermediate plate, in a clamped state of the closing unit.

8. The closing unit of claim 1, wherein the dummy tool is mounted to the other one of the first and second platens and to the intermediate plate, thereby forming a unitary structure comprised of the other one of the first and second platens, dummy tool, and intermediate plate.

9. The closing unit of claim 1, wherein the intermediate plate is constructed to move conjointly with an opening or closing movement of the movable one of the first and second platens.

10. The closing unit of claim 1, wherein the ejector is constructed with its own drive so as to be self-propelled.

11. A closing unit for an injection molding machine, comprising:
- first and second platens, at least one of which being movable;
- an intermediate plate disposed between the first and second platens;
- a molding tool disposed between one of the first and second platens and the intermediate plate;
- means adapted for disabling a molding operation between the other one of the first and second platens and the intermediate plate;
- at least two ejectors arranged in or on the intermediate plate;
- a single drive commonly operating both ejectors; and
- a linkage for interconnecting the drive with the ejectors, with the linkage being constructed so as to render a connection between the drive and one of the ejectors no longer effective.

12. The closing unit of claim 11, wherein the linkage is a toggle mechanism.

13. A system for converting a closing unit for a stack mold to a single-face mold, with the closing unit including first and second platens, of which at least one being movable, an intermediate plate disposed between the first and second platens, said system comprising:
- a molding tool disposed between one of the first and second platens and the intermediate plate;
- a dummy tool which is disposed between the other one of the first and second platens and the intermediate plate and in which no product is made for disabling a molding operation between the other one of the first and second platens and the intermediate plate; and
- at least one ejector arranged in or on the intermediate plate for expellingan end product.

* * * * *